United States Patent

[11] 3,578,799

| [72] | Inventor | Peter Grant Davis<br>Deptford, London, England |
|---|---|---|
| [21] | Appl. No. | 718,885 |
| [22] | Filed | Apr. 4, 1968 |
| [45] | Patented | May 18, 1971 |
| [73] | Assignee | The Molins Machine Company Limited<br>London, England |
| [32] | Priority | Apr. 14, 1967 |
| [33] | | Great Britain |
| [31] | | 17,248/67 |

[54] DEVICES FOR SECURING OR POSITIONING WORKPIECES FOR MACHINING OPERATIONS
3 Claims, 27 Drawing Figs.

[52] U.S. Cl. .................................................. 269/51,
269/52, 269/296, 85/1, 151/69
[51] Int. Cl. ....................................................... B23q 3/02,
F16b 41/00
[50] Field of Search.......................................... 269/47,
49—52, 296—301, 309, 311, 65; 220/(Inquiry);
24/73.8, 73.85 (A), 243 (LP); 85/1 (K); 151/69

[56] References Cited
UNITED STATES PATENTS

| 2,992,685 | 7/1961 | Madsen................ | 151/69X |
| 1,853,162 | 4/1932 | Jacobi..................... | (85/1(K)) |
| 1,087,024 | 2/1914 | Lingo...................... | 269/65 |
| 2,899,196 | 8/1959 | Haagensen et al........... | 269/49 |

Primary Examiner—Lester M. Swingle
Attorneys—Emory L. Groff and Emory L. Groff, Jr.

ABSTRACT: A device for securing a workpiece to a pallet comprises a hollow support element, which can be screwed to the pallet, and which contains a screw urged by a spring to project from a support surface on that side of the support element remote from the pallet. The projecting end of the screw has a hexagonal recess which can receive a key inserted through a hole in the workpiece to rotate the screw and thread it up into the workpiece.

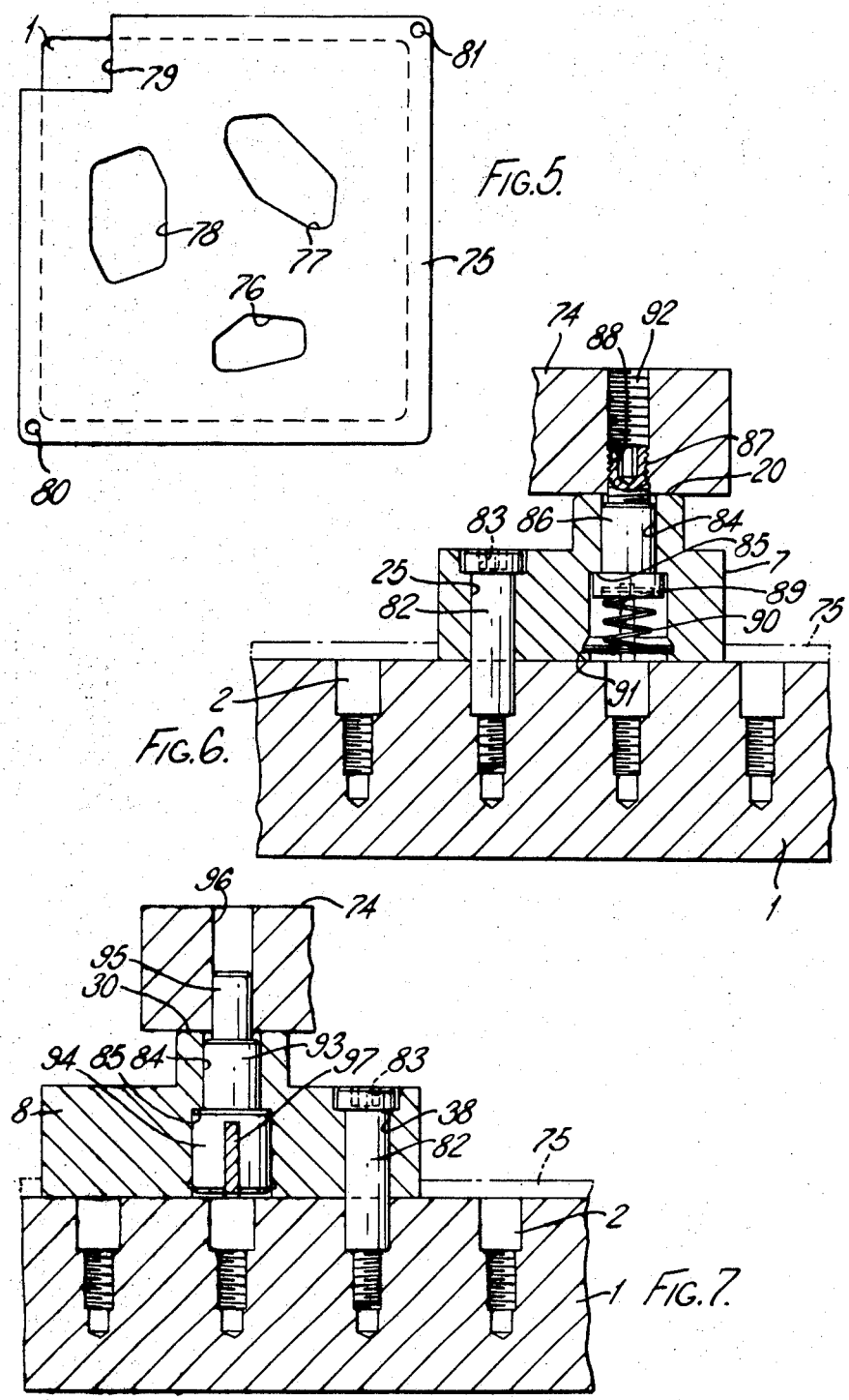

DEVICES FOR SECURING OR POSITIONING WORKPIECES FOR MACHINING OPERATIONS

This invention concerns improvements in or relating to fixing devices and more particularly to devices for use in securing workpieces for machining operations.

In some situations difficulties are encountered in securing an object to a member by reason of limited access for the operation of securing means, such as a screw, and restrictions on the manner in which securing can be effected. For example, where a workpiece is to be secured to a support element fixed to a pallet for a machining operation to be performed on the workpiece, the pallet can prevent access to the side of the support element fixed thereto, and it may be required that no obstruction, such as a screw head, should be present near the surface of the workpiece remote from the support element, since such obstruction might interfere with the machining operation.

According to the present invention there is provided a fixing device comprising a hollow housing having an aperture in a face at one side of the housing, and fixing means adapted to fit in said housing and having a part adapted to project through said aperture and to secure an object relative to said housing by movement of the part relative to the object, wherein said housing provides access for a tool to be inserted through a side of the housing other than the side opposite said one side, and said fixing means is adapted to receive a tool so inserted to effect movement of said part.

Said part of the fixing means may be screw threaded and adapted to screw into an object to be secured to the housing, and there may be provided resilient means, such as a spring, to urge the part to project from the housing.

Further according to the present invention there is provided a fixing device for securing a workpiece to a support element so that a machining operation can be performed on the workpiece while it is so secured, comprising a hollow support element having a support surface at one side thereof and having an aperture in said support surface, a fixing member adapted to fit in said support element and having a screw-threaded part adapted to project from said support surface through said aperture, and resilient means to urge said fixing member in a direction to cause said part to project from said support surface, wherein said fixing member has a recess in said part adapted to receive a tool by means of which the fixing member can be rotated, whereby the tool can be inserted through a hole in the workpiece and through said aperture into said recess to screw said part of the fixing member into the workpiece and thereby secure the latter to the support surface.

Methods and devices in accordance with the present invention will now be described by way of example with reference to the accompanying drawings in which:

FIG. 1 is a plan view of a pallet having three support elements fixed thereto, and showing in broken line a workpiece, FIGS. 2, 3 and 4 are plan views of parts of a pallet having support elements, different from those shown in FIG. 1, fixed thereto, FIG. 5 is a plan view of a template on a pallet, drawn to a different scale from that of FIG. 1, FIG. 6 is a section on the line VI–VI of FIG. 1, drawn to a different scale, FIG. 7 is a section on the line VII–VII of FIG. 1, drawn to a different scale, FIG. 8 is a section on the line VIII–VIII of FIG. 1, drawn to a different scale, FIG. 9 is a side elevation of a marking device, drawn to the same scale as FIG. 8, FIG. 9A is a section through a support element and pallet with a device as shown in, and drawn to the same scale as, FIG. 9, FIG. 10 is a side elevation of a further locating device, drawn to the same scale as FIG. 9, FIG. 11 is a section through a modified form of support element with an associated fixing device, drawn to a different scale from that of FIG. 9, FIG. 12 is a view similar to FIG. 6, but drawn to a different scale, and showing a different form of fixing device, FIG. 13 is a view similar to FIG. 12 showing a further form of fixing device, FIG. 14 is a plan view of a support element fixed to a pallet, drawn to a different scale from that of FIG. 1, FIG. 15 is a section on the line XV–XV of FIG. 14, further showing a workpiece, FIG. 16 is a section through a pallet and a workpiece fixed thereto, drawn to a different scale from that of FIG. 1, FIG. 17 is a plan view of part of a pallet with a support element and associated clamping member fixed thereto, drawn to a different scale from that of FIG. 1, FIG. 18 is a section on the line XVIII–XVIII of FIG. 17, FIG. 19 is a plan view of part of a pallet with a different support element and associated clamping member fixed thereto, drawn to the same scale as FIG. 17, FIG. 20 is a section on the line XX–XX of FIG. 19, FIG. 21 is a plan view of part of a pallet with a further support element and associated clamping member fixed thereto, drawn to the same scale as FIG. 17, FIG. 22 is a section on the line XXII–XXII of FIG. 21, FIG. 23 is a plan view of a template on a pallet, drawn to a scale from FIGS. 17 to 22;

Figure 1:
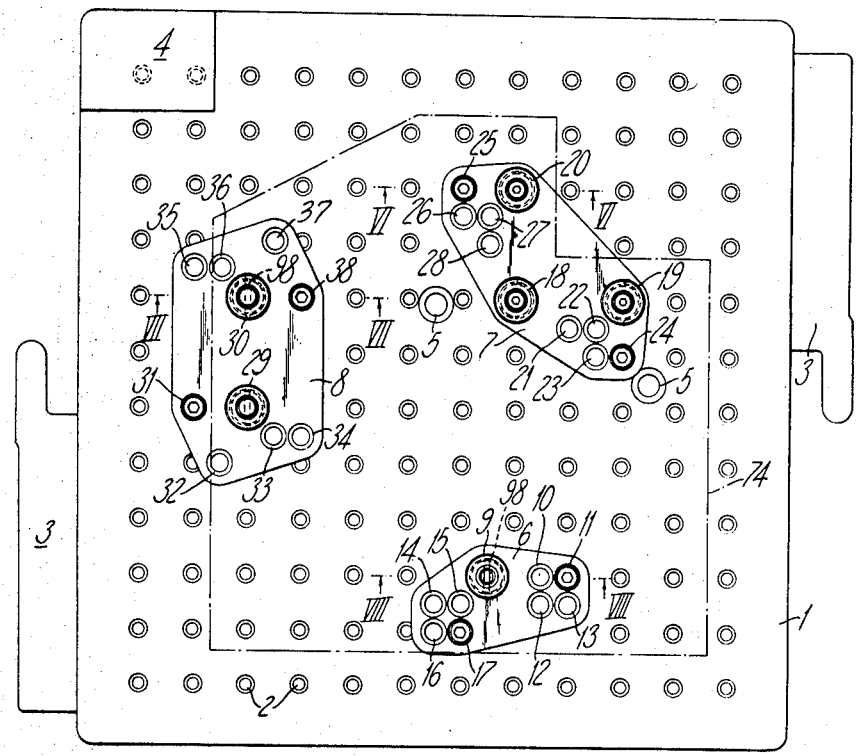

Referring to FIG. 1, a base member in the form of a pallet 1 has prepared fixing locations consisting of tapped holes 2 arranged with their centers at the junctions of a square grid, the spacing of the holes centers, i.e. the distance between adjacent rows and between adjacent columns in the grid, being in the pallet shown 25 mm.

Further features of the pallet are side extensions or lugs 3, provided so that pairs of pallets can be lined together as described in U.S. Pat. application Ser. No. 695,817 a datum pad 4 at one corner, provided for locating a tool in a manner described in U.S. Pat. Nos. Re. 25,956 and 3,241,451 and hole locations 5 for sensing devices used in a manner described in U.S. Pat. No. 3,243,178 for automatic location of the pallet in a machine tool.

Support elements 6, 7 and 8 are mounted on the pallet 1. Each support element has at least one raised support surface for supporting a workpiece and a plurality of prepared fixing positions, consisting of holes through the support element, selected pairs of which can register with pairs of tapped holes 2 in the pallet 1. Thus the support element 6 has a single raised circular support surface 9 and fixing holes 10, 11, 12, 13, 14, 15, 16 and 17, of which holes 11 and 17 are shown in registration with tapped holes 2 in the pallet 1.

The fixing holes 10—17 in the support element 6 are offset one from another in two directions at right angles, corresponding to the directions of the rows and columns of the grid on which the tapped holes 2 are arranged in the pallet 1. The spacing between the centers of the fixing holes in these directions is one half, or a multiple of one half, the spacing between the centers of the holes 2 in the pallet 1, which latter spacing is 25 mm. Thus, for example, the centers of holes 10 and 11 are spaced by 12.5 mm., and the centers of holes 12 and 15 are spaced by 37.5 mm. In other words, the centers of the fixing holes 10—17 lie at the junctions (but not with a hole at every junction) of a square grid having a spacing (i.e. the distance between adjacent rows and between adjacent columns) of 12.5 mm., which is half the spacing of the grid of the tapped holes 2. The center of the support surface 9 is also positioned at a junction of the grid of the fixing holes.

By this arrangement, the center of the support surface 9 can, by registration of different selected pairs of fixing holes with pairs of tapped holes 2, be arranged at different positions relative to the pallet 1 and can, in fact, be located at any junction of a square grid having a spacing of 12.5 mm. In FIG. 1 the fixing holes 11 and 17 are shown in registration with tapped holes 2, but if, for example, the support element were moved to the right as viewed in FIG. 1 to register the fixing hole 10 with the tapped hole 2 with which hole 11 is shown in registry, and to register the fixing hole 16 with the tapped hole 2 with which hole 17 is shown in registry, the support surface 9 would be moved 12.5 mm. to the right from its position shown in FIG. 1.

The support element 7 has three raised circular support surfaces 18, 19 and 20 for supporting a workpiece, and is provided with fixing holes 21, 22, 23, 24, 25, 26, 27 and 28 of which holes 24 and 25 are shown in registration with tapped holes 2. The fixing holes in the element 7 are, like those in the element 6, so positioned that their centers lie at junctions of a square grid having a spacing of 12.5 mm., and the support surfaces 18, 19 and 20 are also positioned with their centers at junctions of the same grid. The positional relationship of the support surfaces to the support element 7 is fixed, but by registration of selected pairs of fixing holes with selected tapped holes 2 the support element 7, and hence the support surfaces 18, 19 and 20 can be arranged at different positions relative to the pallet 1.

The support element 8 has two raised circular support surfaces 29 and 30 for supporting a workpiece, and is provided with fixing holes 31, 32, 33, 34, 35, 36, 37, and 38 of which holes 31 and 38 are shown in registration with tapped holes 2 in the pallet 1. Again, the fixing holes are positioned with their centers at junctions of a square grid having a spacing of 12.5 mm., and the support surfaces 29 and 30 also have their centers positioned at junctions of the same grid. The support surfaces 29 and 30, whose positions relative to the support element 8 are fixed, can thus be arranged at different positions relative to the pallet 1 by registration of selected pairs of fixing holes with selected tapped holes 2.

Figure 2:
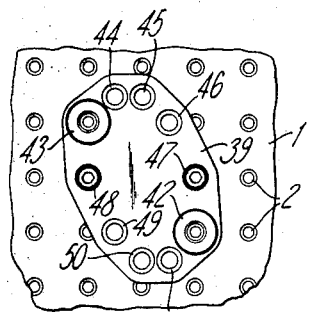
Figure 3:
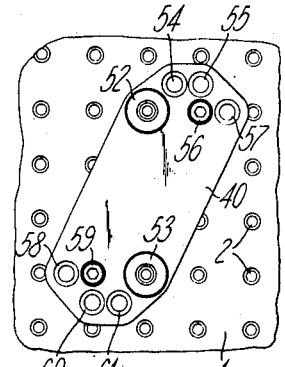
Figure 4:
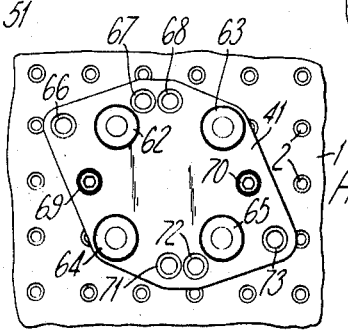

Further support elements 39, 40 and 41 are shown in FIGS. 2, 3 and 4 respectively. The element 39 has two raised circular support surfaces 42 and 43 and fixing holes 44, 45, 46, 47, 48, 49, 50 and 51, of which holes 47 and 48 are shown in registration with tapped holes 2 in the pallet 1. The element 40 has two raised circular support surfaces 52 and 53, and fixing holes 54, 55, 56, 57, 58, 59, 60 and 61 of which holes 56 and 59 are shown in registration with tapped holes 2 in the pallet 1. The element 41 has four raised circular support surfaces 62, 63, 64 and 65 and fixing holes 66, 67, 68, 69, 70, 71, 72 and 73 of which holes 69 and 70 are shown in registration with tapped holes 2 in the pallet 1. The fixing holes in the support elements 39, 40 and 41 are, like those in the support elements 6, 7 and 8 previously described, arranged with their centers at junctions of a square grid having a spacing of 12.5 mm., and the support surfaces have their centers at junctions of the same grid. Thus each support element, and hence its support surfaces, can be arranged at different positional relationships to the pallet 1 by registration of selected pairs of fixing holes with selected tapped holes 2.

By selection of one or more support elements from the elements 6, 7, 8, 39, 40 and 41, and by registration of selected pairs of fixing holes with selected tapped holes 2 in the pallet, a wide variety of support arrangements for workpieces, i.e. of positional relationships of support surfaces to the pallet 1, can be achieved. A support surface can be arranged at any junction of a square grid having a spacing of 12.5 mm. and therefore a part designer has considerable freedom since he can make a selection of such junctions (subject to avoidance of interference between adjacent support elements) for supporting locations on the workpiece from which the part is to be made. By this arrangement the tapped holes 2 in the pallet 1 can be relatively widely spaced (25 mm.) and a comparatively close spacing (12.5 mm.) of possible positions for the center of a support surface can be achieved.

One of the many possible supporting arrangements is illustrated in FIG. 1, which shows a workpiece 74 (in broken line) supported on the support surfaces 9, 18, 19, 20, 29 and 30. To facilitate the fitting of the support elements to the pallet 1 in the correct desired positions, a template 75, shown in FIG. 5, is provided. The template is somewhat larger than the pallet and has apertures consisting of cutout profiles 76, 77 and 78 corresponding respectively to the profile sizes and shapes (as viewed in plan) of the support elements 6, 7 and 8 and arranged in the desired positional arrangement of the support elements. The template has a cutback 79 at one corner, which corresponds to and locates against the datum pad 4, and has different diameter holes 80 and 81, adjacent diagonally opposed corners, which are provided to fit over corresponding different diameter dowels arranged at a work setting table where the workpiece is secured to the pallet, the latter being located at the work setting table in predetermined positional relationship to the dowels. In this manner the template can be applied to, i.e. placed on, the pallet in a predetermined positional relationship thereto so that the cutouts 76, 77 and 78 lie over the pallet at the desired positions of the support elements. The template may also have printing on its top side, e.g. giving instructions regarding the tooling required for the workpiece, so that a work setter knows that the template is the correct way up when the printed side is uppermost. When the template has been applied to the pallet in the correct positional relationship, the support elements 6, 7 and 8 can then be mounted on the pallet at the positions defined by the cutouts 76, 77 and 78 respectively, by placing the support elements in the cutouts.

It will be appreciated that a different template is provided for each required support arrangement. It will be noted that each of the support elements 6, 7 and 8 (FIG. 1) and 39, 40, 41 (FIGS. 2, 3 and 4 respectively) has a differently shaped profile, so that only a correctly shaped support element can be fitted to the pallet in a position defined by a cutout in a template, since a wrong support element would not fit the cutout. It will further be noted that the profile shapes of the support elements 6 and 7, having respectively one support surface (9) and three support surfaces (18, 19 and 20), are totally asymmetric, so that there is only one possible orientation of the support element which fits the cutout in the template. However, the support elements 8, 39 and 40, each of which has two support surfaces, have their profiles so shaped that they can fit a cutout in a template in either of two orientations, 180° displaced from each other, to achieve the same positional relationship of support surfaces to the pallet. Thus, for example, if the support element 8 were rotated through 180° from its position shown in FIG. 1, it would still fit the cutout 78 (FIG. 5) and the positional relationship of support surfaces to the pallet would be the same, but the support surface 29 would occupy the position in which support surface 30 is shown, and vice versa. The support element 41 (FIG. 4), having four support surfaces, similarly has its profile shaped so that it can fit a correspondingly shaped cutout in either of two orientations, 180° displaced from each other, and retain the same positional relationship of support surfaces to the pallet. By this arrangement each template can have one or more cutouts defining a desired selection and positional arrangement of support elements, which provides a unique positional relationship of support surfaces to the pallet.

Figure 8:
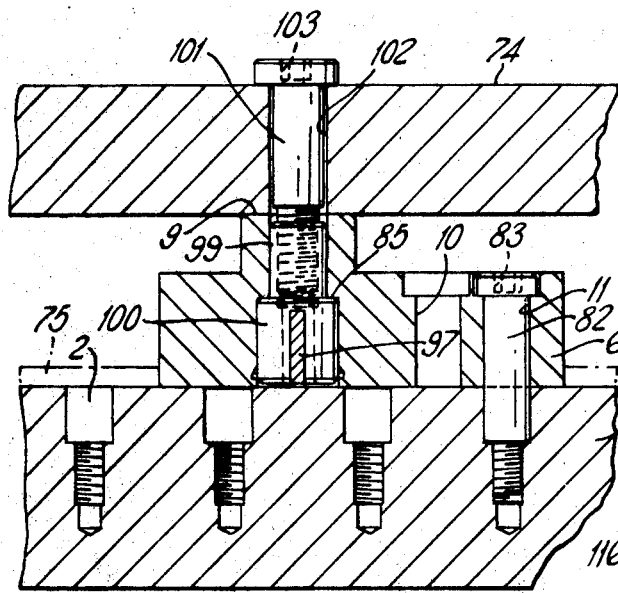

Referring now also to FIGS. 6, 7 and 8, the support elements are fixed to the pallet 1 by means of screws 82 which pass through the fixing holes and screw into the internal thread of the tapped holes 2 with which the fixing holes register. The support element is recessed around the periphery of the upper end of each fixing hole to accommodate the screw head, which has a recess 83, hexagonal in cross section, into which a key can be inserted to turn the screw.

FIGS. 6, 7 and 8 show the workpiece 74 in full line, and the template 75 in broken line since, as is explained later, the template is in practice removed from the pallet before the workpiece is fixed to the support elements. These FIGS. also clearly show how the support surface (e.g. 20 in FIG. 6) is raised from the rest of the support element to support the workpiece clear thereof and clear of the pallet 1.

Each of the support elements 6, 7, 8, 39, 40 and 41 has a hollow portion beneath each support surface, the hollow communicating with a hole in the support surface. Thus as can be seen for example in FIG. 6, there is a hole 84 through the support element extending from the support surface to the bottom face of the support element. The lower portion of the hole 84 is of greater diameter than the upper portion, so that the support element has an internal circular shoulder 85. The hollow or hole 84 can accommodate any one of a number of fixing or locating devices for the workpiece.

FIG. 6 shows fitted in the hole 84 a fixing device comprising a member 86 having an upper part 87 with an external screw thread and an internal recess or keyway 88 of hexagonal cross section, and a lower flanged portion 89 which can abut against the shoulder 85. A spring 90 pushes against the base of the member 86 to urge it upwardly so that the part 87 projects from the support surface 20, the lowermost coil of the spring being of larger diameter than the rest and adapted to fit in a circular recess 91 provided in the support element near the bottom of the hole 84 to hold the spring captive in the hole 84. Upward movement of the member 86 is limited by abutment of the flange 89 against the shoulder 85. This fixing device is used to secure the workpiece 74 to the support surface 20 as follows.

The member 86, with its associated spring 90, is inserted into the hollow 84 from the bottom thereof (as viewed in FIG. 6) before the support element 7 is fixed to the pallet 1, the externally threaded part 87 being caused to project from the surface 20 by the action of the spring 90. After the support element 7 has been fixed to the pallet 1, the workpiece 74, which has an internally threaded hole 92 at the location where it is to be fixed to the support surface 20, is placed on the surface 20, thereby depressing the part 87 into the support element against the action of the spring 90. A key is then inserted, through the hole 92 in the workpiece, into the recess 88 to turn the member 86 so that the part 87 is threaded up into the hole 92, assisted by the action of the spring 90. It will be appreciated that this form of fixing device leaves the upper surface of the workpiece clear and unobstructed by screw heads or the like, and further permits the device to be screwed into the workpiece when the side of the support element, i.e. its base as viewed in FIG. 6, through which the device was inserted is inaccessible because it lies against the pallet 1.

FIG. 7 shows fitted in the hollow or hole 84, communicating with the support surface 30, a locating device 93 having a lower portion 94 of increased diameter, corresponding to the larger diameter of the lower portion of hole 84, which provides a flange to abut against the shoulder 85, and an upper portion 95, consisting of a plain dowel, which projects from the support surface 30 to fit in a hole 96 in the workpiece 74 to correctly locate the latter. The lower portion 94 of the device 93 is slotted to accommodate a diametrical key member 97 which tightly fits in a keyway 98 (see FIG. 1) in the support element 8 to retain the locating device in the support element and to prevent rotation of the locating device 93.

FIG. 8 shows fitted in the hollow or hole 84, communicating with the support surface 9, a fixing device 99 having a lower portion 100 like the lower portion 94 of the device 93 described above, of increased diameter to fit the larger diameter lower portion of hole 84 and to provide a flange which can abut against the shoulder 85. The upper portion of the device 99 (whose position corresponds to that of the central portion of the device 93) is hollow and internally threaded so that the workpiece 74 can be fixed to the support surface 9 by means of a screw 101 passing through a hole 102 in the workpiece and threaded into the device 99, the screw having a recess 103, of hexagonal cross section, for a key in its head. The lower portion 100 of the device 99 has (like the lower portion 94 of the device 93) a slot in which a diametrical key member 97, fitting in a keyway 98 in the support element, is accommodated to retain and prevent rotation of the device 99.

Figure 9:
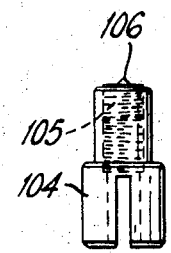
Figure 9A:
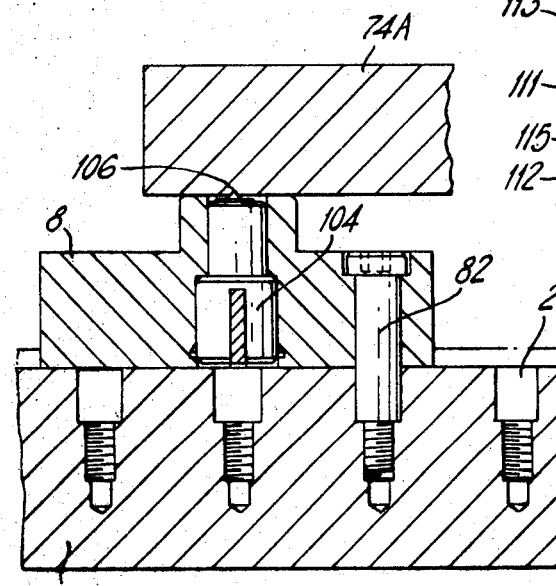

In FIG. 9 there is shown a marking device 104 adapted to fit in a hollow or hole 84 in a support element. The main part of the device 104 is identical to the fixing device 99 (FIG. 8), and therefore needs no further description, but screwed into the internal thread of the device 104 is an externally threaded element 105 having a diamond tip 106. FIG. 9A shows the device 104 fitted in the support element 8 (in place of the device 93 shown in FIG. 7) so that the diamond tip 106 projects from the support surface 30, and when a workpiece 74A is positioned and pressed down on to that support surface the diamond 106 indents the workpiece and provides a spot datum mark on the surface of the workpiece, which mark can be used when the workpiece is later reset. Thus, for example, if a workpiece has to be reset, i.e. relocated in relation to a pallet, between two separate machining operations, the second of which is dependent on the first in that the required positioning of the workpiece for the second operation depends on its positioning for the first operation, a device as shown in FIG. 9 can be used to mark the workpiece while it is supported for the first operation, and the mark can then serve as a datum point for resetting the workpiece in the correct position for the second operation.

A particular use of the marking devices 104 occurs when it is required to machine a workpiece on opposite faces thereof. This may be achieved by securing the workpiece to a pallet with one of the faces facing the pallet (and thereby inaccessible for machining) and subjecting the workpiece to a first machining operation on the other of the faces, which is facing away from the pallet and is therefore exposed for machining. The workpiece is then released from the pallet and inverted before being resecured thereto so that the other face of the workpiece, which has been machined, faces the pallet and the one face of the workpiece faces away from the pallet and can be machined by a second machining operation.

It will be appreciated that if the positional relationship of the workpiece to the pallet for the second machining operation is the same as that for the first machining operation, except for inversion of the workpiece, the workpiece can be considered merely to have been rotated through 180° about an axis through the workpiece, and parallel and bearing a fixed relationship to the surface of the pallet, during its change from the first to the second positional relationship. The workpiece can then accurately be repositioned relative to the pallet after inversion by accurately relocating the axis about which the workpiece is considered to have been rotated, and the position of the workpiece along that axis, so that they bear the same relationship to the pallet as when the workpiece was in the first positional relationship. Such accurate relocation of the workpiece is normally required because it is usually necessary that the pattern of machining on the workpiece effected by the second machining operation bears an accurate predetermined positional relationship to the pattern of machining effected by the first machining operation.

The above can be achieved by securing a plurality of marking devices 104, in support elements to the pallet 1 at positions such that when the workpiece is secured to the pallet in the first positional relationship at least two spot indent marks are made on the under surface of the workpiece to define the axis about which the workpiece is considered to be rotated to effect the required inversion, and the position of the workpiece therealong. The marks are thus made to lie on a line parallel to the axis and in a plane containing said axis and normal to the pallet surface. When, after the first machining operation, the workpiece is released from the pallet and inverted, it can be accurately relocated relative to the pallet by positioning the workpiece to locate the marks, which are then on the upper surface of the workpiece, at the same positions as previously over the pallet, i.e. the same positions relative to the pallet when the latter is viewed in plan.

In practice the marking devices 104 are secured, in support elements, to the pallet 1 nominally at the positions necessary to define the axis on the workpiece, i.e. nominally at positions at junctions of the square grid on which the marking devices can be located, but there will normally be a small unavoidable error between the actual and nominal positions. When the workpiece is released from the pallet the actual positions of the diamond tips 106 relative to the pallet are therefore ascertained by viewing the pallet, in plan, through a microscope and the deviation between the nominal and actual positions is measured. The workpiece is then inverted and repositioned on the pallet by locating the marks, viewed through the microscope, at positions which account for the measured deviations, in fact positions determined by applying a mirror-image correction for the measured deviations. Conveniently the microscope is provided with a visible digital read-out.

Normally the workpiece is resecured to the same pallet as that to which it was secured for the first machining operation, but, if desired, the workpiece may be resecured to a different pallet from, but of the same form as, that to which it was secured for the first machining operation. For example, a different arrangement of support devices may be required to support the workpiece for the second machining operation, and it may be more convenient to transfer the workpiece from one pallet to another, which is preloaded with the required different arrangement of support devices, rather than to change the arrangement of support devices on the pallet to which the workpiece was secured for the first machining operation.

It is to be understood that the particular manner of use of marking devices 104 described above is given by way of example. The marking devices can provide marks on a workpiece defining the positional relationship in which it was secured to the pallet, and can therefore be used in various ways to relocate the workpiece on the same, or another similar, pallet in a position bearing an accurate predetermined relationship to said positional relationship.

Figure 10:
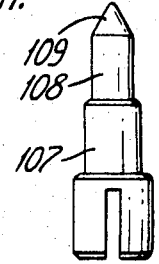

In FIG. 10 there is shown a locating device 107 essentially similar to the device 93 (FIG. 7) previously described, but having an upper portion 108 terminating in a cone 109 having a flat tip. When the device is fitted in a hollow or hole 84 of a support element so that the upper portion projects from a support surface into a hole in a workpiece, the tip of the cone 109 can act as a datum point for location by microscope.

The provision of a common form of hollow or hole 84 communicating with each support surface in each of the support elements 6, 7, 8, 39, 40 and 41, and of a plurality of different fixing and locating devices 86, 93, 99, 107 and 105 adapted to fit in the hollow or hole 84 enables different fixing or locating requirements to be met by insertion of appropriate fixing or locating devices in the appropriate hollows or holes communicating with the support surfaces at which the particular forms of fixing or locating are required.

The devices so far described are used as follows. When a particular workpiece is to be machined, the support elements required for supporting the workpiece are selected, as well as a template appropriate for the required supporting arrangement, and the necessary fixing and locating devices. For convenience and by way of example, the method of securing the workpiece 74 to the pallet 1 in a manner as shown in FIG. 1 will be described. In this case the support elements 6, 7 and 8 are selected, as well as the template 75 (FIG. 5), three fixing devices 86 (FIG. 6) for fitting in the support element 7, two locating devices 93 (FIG. 7) for fitting in the support element 8, and one fixing device 99 (FIG. 8) for fitting in the support element 6. There are also provided six screws 82, for fixing the support elements to the pallet, and a screw 101 for securing the workpiece to the support element 6. The workpiece 74 is prepared with threaded holes 92 (FIG. 6) at the positions where it is to be secured to the support element 7, and plain holes 96 and 102 (FIGS. 7 and 8) at the positions where it is to be located on and secured to the support elements 8 and 6 respectively.

The appropriate fixing or locating devices are fitted in the holes or hollows 84 in the support elements, i.e. the fixing devices 86 are fitted in the support element 7, the lower coil of the spring 90 being pressed into the recess 91 to retain the device in the support element, the locating devices 93 are inserted in the support element 8 and the fixing device 99 is inserted in the support element 6, the devices 93 and 99 being retained in their respective support elements by the key members 97.

The template 75 is applied to, i.e. laid on, the pallet 1 in a positional relationship thereto determined by location of the cutback 79 against the datum pad 4 on the pallet and registry of the holes 80 and 81 over dowels provided at the work-setting table in fixed positional relationship to the pallet. Printing on the upper side of the template may provide a further check that the template is the correct way up. The support elements 6, 7 and 8 are then placed on the pallet in the positions defined by the template, i.e. so that the support elements 6, 7 and 8 respectively fit into the cutouts 76, 77 and 78, and are fixed to the pallet by means of screws 82 passing through the fixing holes 11 and 17, 24 and 25, and 31 and 38 and threaded into the tapped holes 2 in the pallet with which these fixing holes register. The template 75 is then lifted vertically to remove it from the pallet.

The workpiece is placed on the support elements so that the prepared holes in the workpiece register with the holes 84 in the support surfaces, the projecting upper dowel portions 95 of the devices 93 in the support element 8 locating in the holes 96 in the workpiece as shown in FIG. 7. The projecting threaded portions 87 of the devices 86 in the support element 7 are pressed down, against the action of the springs 90, as the workpiece 74 is placed on the support surfaces 18, 19 and 20 and are then screwed upwardly, assisted by the action of the springs, into the threaded holes 92 in the workpiece by means of a key inserted in the recess 88, such upward movement being limited by engagement of the flange 89 against the shoulder 85 (see FIG. 6). The workpiece is secured to the support element 6 by threading the screw 101 through the hole 102 in the workpiece into the internally threaded portion of the fixing device 99 (see FIG. 8).

It will be understood that the above described selection of support elements and fixing and locating devices is given only by way of illustration and example and that a wide variety of support elements, fixing and locating devices for use in the support elements, and positional relationships of the support elements to the pallet is possible.

Figure 11:
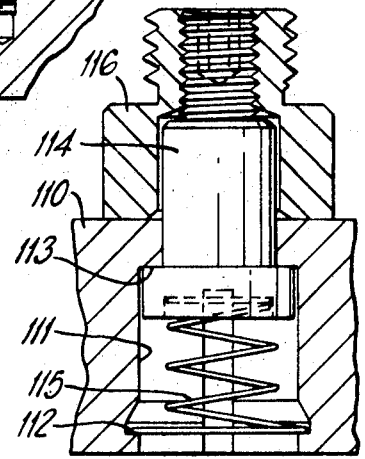

In FIG. 11 there is shown a modified form of support element 110 having a hole or hollow 111, with a circular recess 112 and a shoulder 113, in which there is accommodated a fixing device 114, with associated spring 115, which is identical to the fixing device 86 with spring 90 (FIG. 6) previously described. The support element 110 does not have a raised support surface, as does, for example, the support element 7, but instead there is provided a hollow part 116 whose upper portion has an internal thread corresponding to the external thread on the upper portion of the fixing device 114, and an external thread of greater diameter, the part 116 being adapted to rest on the support element 110. The purpose of this arrangement is to enable a functional hole, in a workpiece i.e. a hole having a function in the part to be produced from the workpiece, to be utilized for securing the workpiece during a machining operation. The functional hole may have an internal thread and be of different diameter from the externally threaded upper portion of the fixing device 114. The part 116 can be provided with an external thread corresponding to that of the functional hole in the workpiece. In practice, the part 116 is first threaded into the functional hole in the workpiece which is then placed over the support element 110 so that the part 116 is located over the fixing device 114, depressing the latter against the action of the spring 115. The device 114 can then be screwed upwardly into the internal thread of the part 116 by means of a key fitting in the recess in the upper portion of the device 114.

Figure 12:
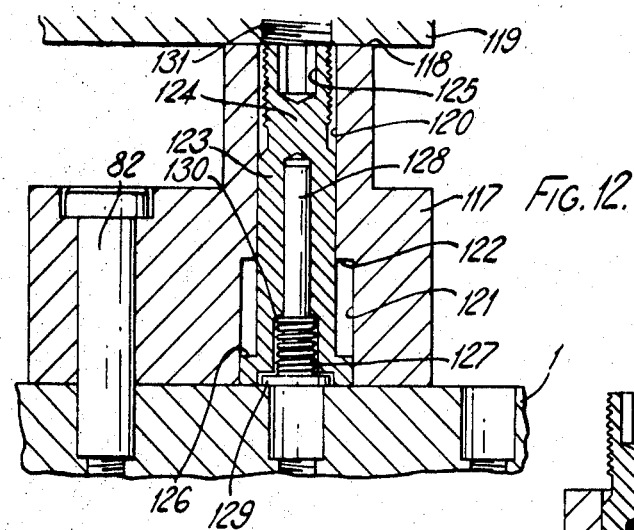

In FIG. 12 there is shown a support element 117, fixed to the pallet 1 by a screw 82, and having a raised support surface 118 for supporting a workpiece 119. The support element 117 has a hole 120, communicating with the support surface 118, and having a lower part 121 of increased diameter thus providing a shoulder 122. Fitted in the hole 120 is a fixing device comprising a member 123 having an upper portion 124, with an external screw thread and an internal recess 125 of hexagonal cross section, and a lower flanged portion 126 which fits in the increased diameter part of the hole 121 and can abut against the shoulder 122. A spring 127 is coiled round a cylindrical core 128 fixed to a base disc 129 which fits in a recess in the flanged portion 126. The core 128 extends into a central hollow in the member 123 which is provided with an internal shoulder 130 against which the spring 127 abuts. The fixing device can be used as follows. The workpiece 119, having an internally threaded hole 131 at the position where it is to be secured to the support surface 118, is placed on the support surface so that the holes 131 and 120 register, thereby depressing the member 123 against the action of the spring 127, the member 123 being shown in the depressed position in FIG. 12. A key is then inserted, through the hole 131 in the workpiece, into the recess 125 to thread the portion 124 upwardly into the hole 131, such upward movement of the member 123 being assisted by the action of the spring 127 pressing against the shoulder 130, and being limited by abutment of the flanged portion 126 against the shoulder 122.

Figure 13:
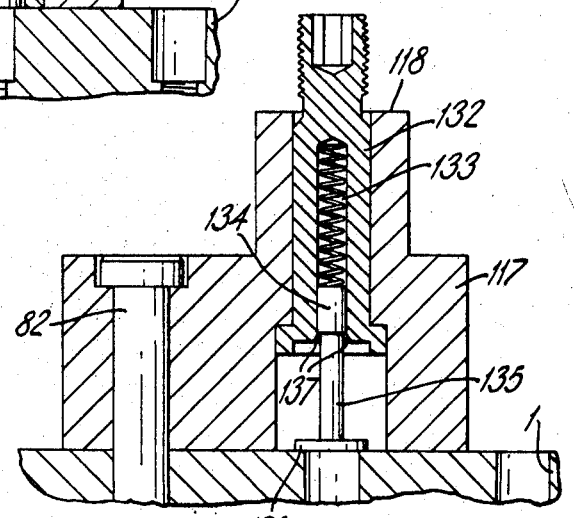

FIG. 13 shows the same support element 117 as FIG. 12 but with a different form of fixing device. The fixing device of FIG. 13 comprises a member 132 essentially similar to the member 123 but with a central hollow of the same diameter throughout its length (i.e. without the shoulder 130) in which a spring 133 is housed. A piston head 134, on a rod 135 having a base disc 136, is also housed in the central hollow, abutting against the spring 133, the lower end of the hollow having small welds 137 to retain the piston head in the hollow. The fixing device shown in FIG. 13 can be used in exactly the same way as that in FIG. 12, and in FIG. 13 the device is shown with the member 132 in its raised position, i.e. with the externally threaded upper portion projecting from the support surface 118.

It will be seen that the fixing devices shown in FIGS. 6, 12 and 13 work on the same principle and all have the advantage that they can be inserted into a support element from one side thereof, when that side is accessible, and can be screwed into a workpiece when the said one side of the support element is inaccessible. The devices in FIGS. 12 and 13 are not provided with means to retain them in the support element but can readily be so retained by holding against the base discs 129 and 136 respectively.

As previously described, the pallet 1 with tapped holes 2 arranged at the junctions of a square grid with a spacing of 25 mm. and the support elements 6, 7, 8, 39, 40 and 41 (or similar support elements 110 and 117—FIGS. 11, 12 and 13) having fixing holes and support surfaces arranged with their centers at junctions of a square grid with a spacing of 12.5 mm., enable support surfaces to be arranged at any of the junctions of a square grid having a spacing of 12.5 mm. (subject to avoidance of interference between adjacent support elements) so that different workpieces can be supported providing the supporting locations on each workpiece lie at junctions of a square grid of 12.5 mm. spacing. The occasion may arise, however, where a workpiece which can be supported at one or more locations lying on that grid i.e. at locations on the workpiece at which support surfaces can be arranged, requires additional support at a further location not on that grid.

Figure 14:
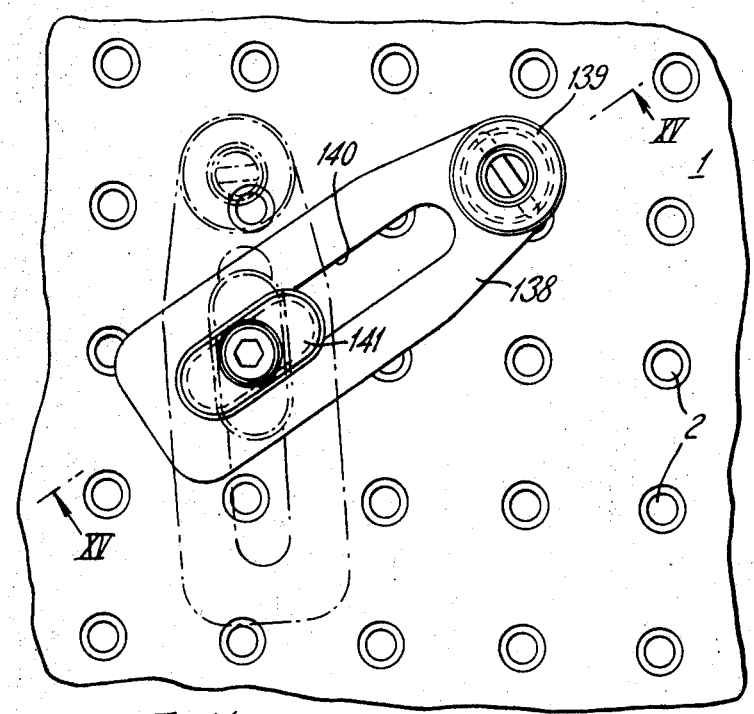
Figure 15:
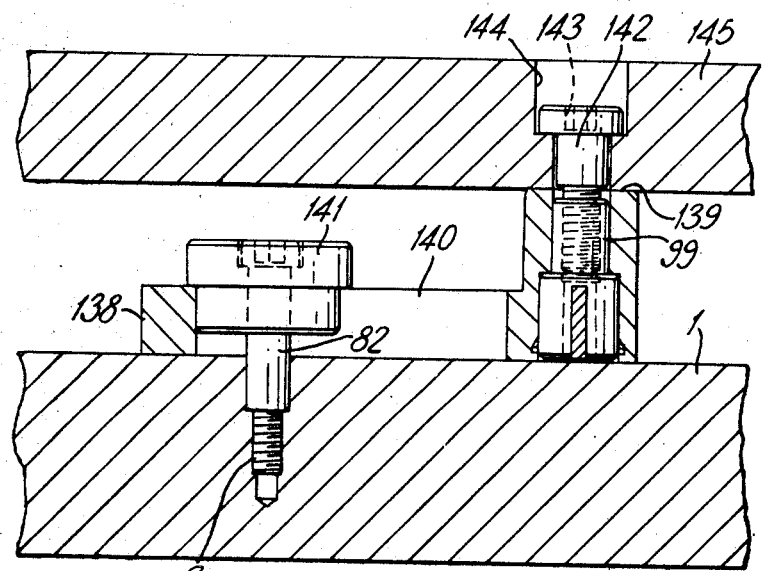

In FIGS. 14 and 15 there is shown fixed to the pallet 1 an adjustable support element 138 having a raised circular support surface 139, and a longitudinal slot 140. A rider 141 is slidably mounted in the slot 140, and has a hole to accommodate a screw 82 (as previously described) which threads into a tapped hole 2 in the pallet 1, the top of the rider being recessed to accommodate the screw head. By this arrangement the support surface 139 can be arranged at any position, within a range determined by the extent of the slot 140, about a particular tapped hole 2 in the pallet. Thus the orientation of the support element can be selected by rotating it about the tapped hole 2 to which it is to be fixed, and the distance of the support surface 139 from the tapped hole 2 can be selected by sliding the support element relatively to the rider 141. When the support surface is in the desired position the support element can be fixed to the pallet by threading the screw 82, through the hole in the rider, into the tapped hole 2. By way of illustration the element 138 is shown in two positions in FIG. 14, in one of which the element is drawn in broken line. The support element 138 can, of course, be fixed to any of the tapped holes 2 in the pallet 1 and the support surface 139 can therefore be arranged at any position on the pallet.

In FIG. 15 the support element 138 is shown with a fixing device 99 (as previously described with reference to FIG. 8) fitted in the hole communicating with the support surface 139. The device 99 has an internal thread into which is screwed a screw 142, having a recess 143 in its head, and which passes through a hole 144 in a workpiece 145, the hole 144 being of larger diameter at its upper part to accommodate the screw head so that it does not project from the upper surface of the workpiece. It will be appreciated that different selected fixing and locating devices can be fitted in the support element 138 to meet different fixing and locating requirements.

Figure 16:
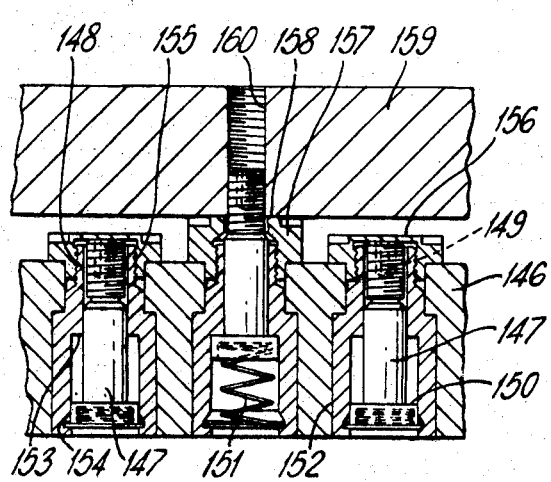

FIG. 16 shows a section through a pallet 146 having fixing locations arranged at the junctions of a square grid or matrix with a spacing of 25 mm. (as are the tapped holes 2 in the pallet 1 shown in FIG. 1) and wherein a fixing device 147, essentially similar to the fixing device 86 previously described with reference to FIG. 6, is provided at each fixing location. Thus, each fixing device 147 comprises a member with an externally threaded upper portion 148 with an internal recess 149 of hexagonal cross section, and a lower flanged portion 150 against which a spring 151 presses. The fixing device is fitted in a hollow housing 152 having a shoulder 153, against which the flange 150 can abut, and having a circular recess 154 in which the lowermost coil of the spring can be accommodated to retain the spring captive in the housing. The spring 151 urges the member 147 upwardly to cause the upper externally threaded portion 148 to project from the top surface of the pallet. Each housing has an upper, externally threaded portion 155 which projects slightly from the upper surface of the pallet 146. A plurality of capping members 156, each having an internal thread corresponding to the external thread on the housings, are provided to screw on to the housings and thereby retain the members 147 against the action of the springs 151 to cap and limit projection of the externally threaded portions 148 from the top surface of the pallet.

These capping members 156 are applied to the housings 152 at all fixing locations other than those selected fixing locations at which the members 147 are required to project from the pallet for fixing a workpiece thereto. It will be appreciated that by leaving different selections of fixing locations uncapped, different numbers and positional arrangements of projecting fixing devices 147 can be achieved and therefore workpieces requiring different fixing arrangements, i.e. requiring fixing at different positional relationships to the pallet, can be accommodated.

At those selected fixing locations where a workpiece is to be fixed to the pallet, i.e. the fixing locations at which a capping member 156 is not screwed on to the housing 152, such as the central fixing location shown in FIG. 16, a support element 157 having a raised support surface 158 is screwed on to the housing in place of a capping member. The support surface 158 has a central hole through which the externally threaded upper portion 148 of the member 147 can project, urged upwardly by the spring 151. A workpiece 159, having an internally threaded hole 160 at the position where it is to be fixed, can then be fixed to the support element 157 and pallet 146 in a manner previously described, namely by placing the workpiece on the support element, with the hole 160 is register with the hole in the support surface 158, thereby depressing the member 147 against the action of the spring 151, and the externally threaded portion 148 can then be screwed up into the hole 160 by the application of a key through the hole 160 into the keyway or recess 149.

FIGS. 17 to 22 show support elements and associated clamping members for securing workpieces to the pallet 1.

Figure 17:
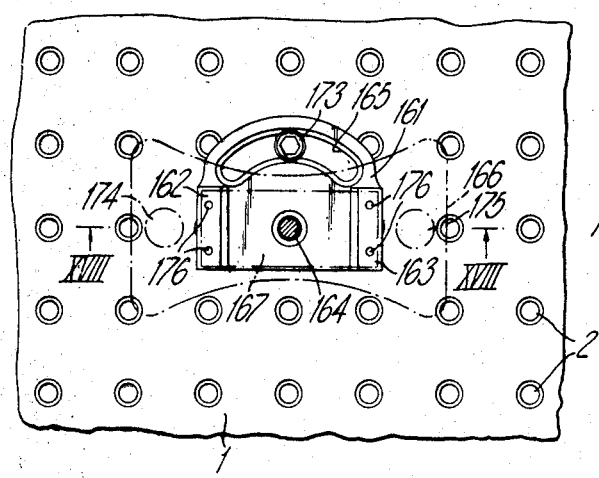
Figure 18:
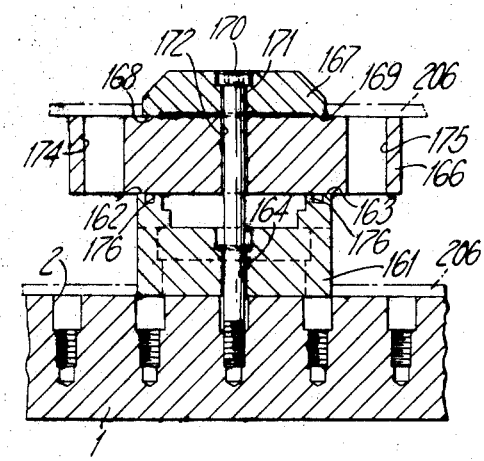

Referring to FIGS. 17 and 18, a support element 161, having two raised rectangular support surfaces 162 and 163, is provided with a fixing hole 164 and a slot 165 arcuate about the fixing hole. The fixing hole 164 can register with any of the tapped holes 2 in the pallet 1 and the mean radius of the slot 165 corresponds to the spacing of the square grid on which the tapped holes 2 lie (i.e. 25 mm.) so that the slot registers with an adjacent tapped hole 2, the slot extending along an arc of 90° to ensure that at least one tapped hole 2 registers with it whatever the orientation of the support element 161. The support surfaces 162 and 163 can thus be arranged at different positional relationships to the pallet 1 by registration of the fixing hole 164 with different tapped holes 2 and by rotating the element 161 about the fixing hole 164 to achieve a desired orientation.

A workpiece can be supported on the support surfaces 162 and 163, and FIGS. 17 and 18 show (in broken line in FIG. 17 and full line in FIG. 18) a finished part 166 machined from a workpiece so supported. The workpiece is secured to the support surfaces 162 and 163 by means of a clamping member 167 having two downwardly depending rectangular clamping surfaces 168 and 169 which are positioned on the workpiece directly above the support surfaces 162 and 163. The profile of the clamping member (as viewed in plan) is rectangular and corresponds to the profile of that part of the support element carrying the support surfaces for a purpose explained later.

The clamping member 167 is fixed to the pallet 1 by a screw 170 passing through a hole 171 in the clamping member, a registering hole 172 in the workpiece, and the fixing hole 164 in the support element, and threaded into the tapped hole 2 in the pallet 1 with which the fixing hole 164 registers. The support element 161 is further fixed to the pallet 1 by a screw 173 passing through the slot 165 and threaded into a tapped hole 2 in registry with the slot A workpiece clamped and supported in this manner can, for example, be machined to the shape of the part 166 shown in FIG. 17 and can have holes 174 and 175 drilled therein.

FIGS. 17 and 18 show a workpiece supported on and clamped to both support surfaces 162 and 163. It might be desired, however, to clamp a workpiece to only one of the support surfaces, for example the surface 162, in which case a packing piece, of the same thickness (i.e. height) as the workpiece, would be provided between the support surface 163 and the clamping surface 169. The support surfaces 162 and 163 are provided with holes or recesses 176 to accommodate projections from such a packing piece and thereby prevent it from slipping.

Figure 19:
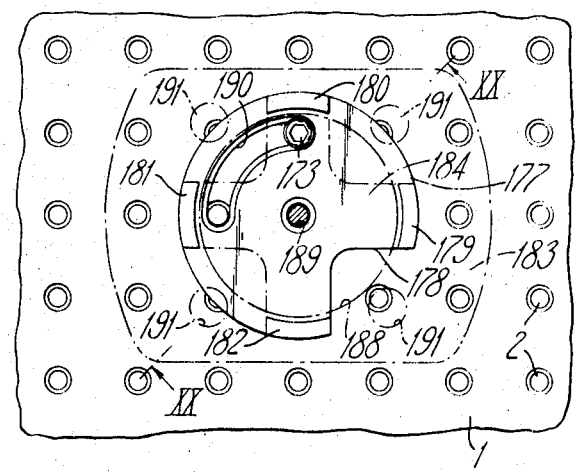
Figure 20:
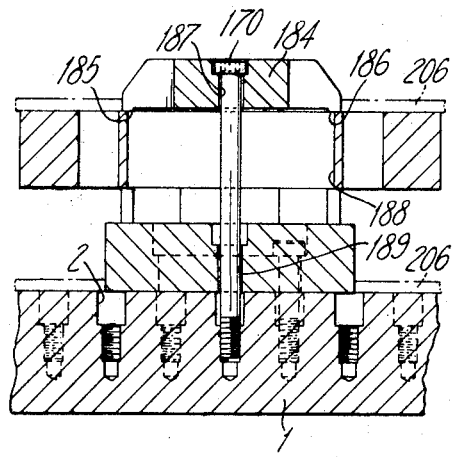

FIGS. 19 and 20 show fixed to the pallet 1 a support element 177 of circular shape (as viewed in plan), apart from a wedge-shaped cutout 178, and having four raised arcuate support surfaces 179, 180, 181 and 182. The surfaces support a workpiece from which a part 183, shown in broken line in FIG. 19 and full line in FIG. 20, is machined. The workpiece is secured to the support surfaces by means of a cross shaped clamping member 184 having four downwardly depending clamping surfaces, two of which, 185 and 186, are indicated in FIG. 20, which are positioned on the workpiece directly above the support surfaces 179, 180, 181 and 182. The clamping member and support element are fixed to the pallet 1 in the same manner as previously described with reference to the support element 161 and clamping member 167, namely by means of a screw 170 passing through a central hole 187 in the clamping member, a large hole 188 in the workpiece, and a central fixing hole 189 in the support element, and threaded into a tapped hole 2, the support element being further fixed to the pallet by a screw 173 passing through an arcuate slot 190 in the support element and threaded into an adjacent tapped hole 2. The profile (as viewed in plan) of the clamping member 184 between adjacent clamping surfaces corresponds to the cutout 178 in the support element for a purpose explained later. A workpiece clamped in the manner shown in FIGS. 19 and 20 can, for example, be machined to the shape of the part 183 and have four holes 191 drilled therein.

Figure 21:
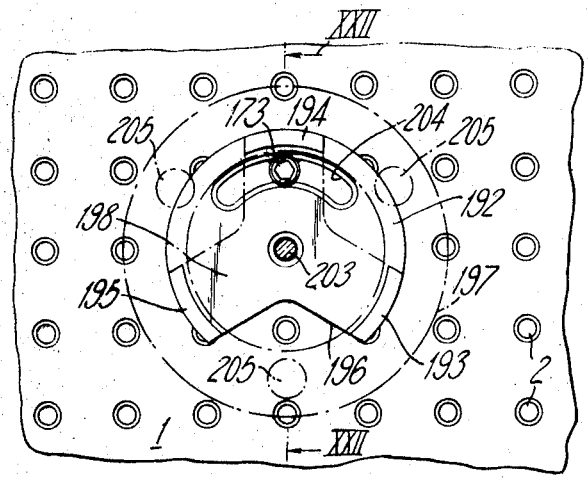
Figure 22:
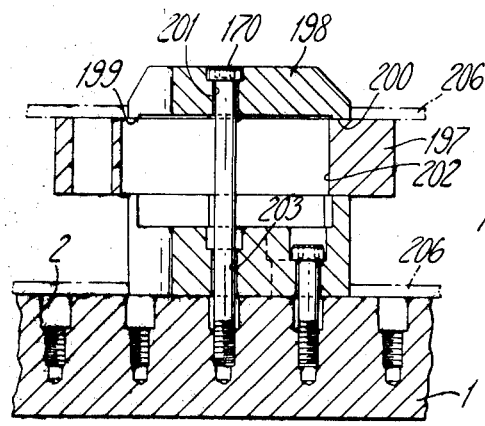

FIGS. 21 and 22 show fixed to the pallet 1 a support element 192, essentially similar to the support element 177, but having three raised arcuate support surfaces 193, 194 and 195. Thus the element 192 is of circular shape (as viewed in plan) apart from a wedge-shaped cutout 196 (of different size from the cutout 178). The support surfaces support a workpiece from which a part 197 (shown in broken line in FIG. 21 and full line in FIG. 22) is machined. A Y-shaped clamping member 198 having three downwardly depending clamping surfaces, two of which, 199 and 200, are indicated in FIG. 22, is provided to clamp the workpiece to the support surfaces with the clamping surfaces directly thereabove. A screw 170 passing through a central hole 201 in the clamping member, a large hole 202 in the workpiece and a central fixing hole 203 in the support element, and threaded into a tapped hole 2 in the pallet 1, and a screw 173 passing through an arcuate slot 204 in the support element and threaded into an adjacent tapped hole 2, fix the support element and clamping member to the pallet 1, as previously described. The profile (as viewed in plan) of the clamping member 198 between adjacent clamping surfaces corresponds to the cutout 196 in the support element for a purpose explained later. A workpiece clamped in the manner shown in FIGS. 21 and 22 can, for example, be machined to the shape of the part 197 and have three holes 205 drilled therein.

It will be appreciated that the support elements shown in FIGS. 17 to 22 can be fixed at different positions to the pallet 1 by registration of their fixing holes with different tapped holes 2, and can be fixed at different orientations by reason of their arcuate slots extending round 90° so that the slot registers with an adjacent tapped hole 2 whatever the orientation of the support element. It is further to be understood that the support elements and associated clamping members described are given only by way of example and that other configurations of support elements and support surfaces (and corresponding clamping members and clamping surfaces) may be provided. In particular, there may be provided further support elements, essentially similar to the element 161 (FIGS. 17 and 18), but with different spacings between the support surfaces 162 and 163, and other support elements, essentially similar to the elements 177 and 192, but in which the support surfaces lie at different radii, together with corresponding clamping members.

Figure 23:
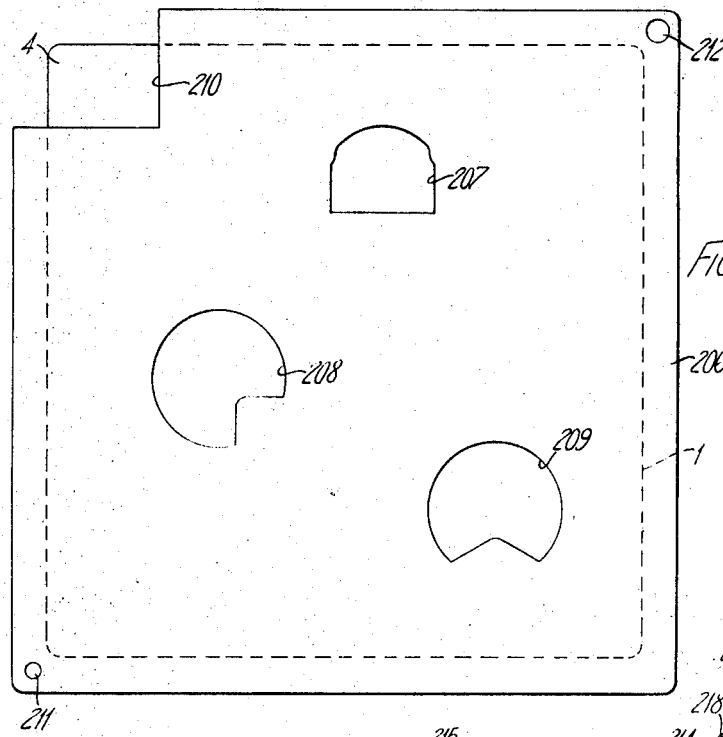

To facilitate fixing of support elements and clamping members in desired positional relationships to the pallet 1, templates are provided, there being a separate template for each separate desired positional arrangement of support elements. By way of illustration, FIG. 23 shows a template 206 having three apertures consisting of cutout profiles 207, 208 and 209 corresponding respectively to the profile sizes and shapes (as viewed in plan) of the support elements 161, 177 and 192. The template 206, like the template 75 (FIG. 5) previously described, has a cutback 210 at one corner, which locates against the datum pad 4 on the pallet 1, and two different diameter holes 211 and 212 located adjacent diagonally opposed corners, and is somewhat larger than the pallet 1. The template may further have printing on its upper surface. The holes 211 and 212 can locate over dowels to which the pallet 1 can be positioned in predetermined relationship.

In use, the template 206 is applied to the pallet 1, which has been positioned relative to the dowels, by locating the holes 211 and 212 over the dowels, and the template is thus laid on the pallet 1 in predetermined positional relationship thereto. The support elements 161, 177 and 192 are then placed on the pallet in positions defined respectively by the cutouts 207, 208 and 209, by placing the support elements in the cutouts, and screws 173 are placed through the arcuate slots in the support elements and threaded into the tapped hole 2 (or, in the case of the element 177 as shown in FIG. 19, one of the tapped holes 2) with which the slot registers. The template 206 is then lifted vertically and removed from the pallet. A workpiece, having prepared holes 172, 188 and 202 at locations corresponding to the positions of the support elements, is placed on the support surfaces, and the template 206 is then placed on the workpiece in the same positional relationship to the pallet (determined by the dowels over which the holes 211 and 212 locate) as previously. The clamping members 167, 184 and 198 are then placed on the workpiece at positions defined respectively by the cutouts 207, 208 and 209 by placing the clamping members in the cutouts. As described previously, part of the profile of each of the clamping members corresponds to part of the profile of the associated support element, and hence to part of the profile of the appropriate cutout in the template. Therefore, by locating the said part of the profile of the clamping member against the said part of the profile of the cutout in the template it can be ensured that the clamping surfaces are positioned on the workpiece directly above the support surfaces (which latter are, of course, obscured from view by the workpiece). The clamping members are then fixed to the pallet by means of screws 170 as previously described, and the template is removed vertically. In FIGS. 18, 20 and 22 the template is shown, in broken line, in two positions, one on the pallet and the other on the workpiece.

The preceding paragraph is intended merely to illustrate the general manner in which support elements and clamping members such as those shown in FIGS. 17 to 22 are used and applied. In practice, these support elements and clamping members would normally be used together with further support elements and fixing or locating devices for the workpiece as previously described with reference to FIGS. 1 to 16.

For example, the part 197 shown in FIGS. 21 and 22 might be made by a procedure as follows. The support element 192 and a number of surrounding support elements with fixing devices like the support element 7 (FIG. 1) are fixed to the pallet 1 at positions defined by an appropriate template, the support element 192 being fixed only by a screw 173 through the slot 204. After removing the template from the pallet, a workpiece which is blank, apart from holes for the fixing devices, is fixed to the said surrounding support elements. The workpiece is then machined to cut the large hole 202 in it. After machining, the template is placed on the workpiece, and the clamping member 198 is applied to the workpiece at the position defined by the appropriate cutout in the template, and fixed to the pallet by a screw 170. The workpiece is then again machined to cutout the shape of the part 197 and drill the holes 205. The workpiece, and the clamping member and support elements can then be removed from the pallet. In some cases the said surrounding support elements may be removed from the pallet after the clamping member is fixed and before the second machining operation.

Figure 24:
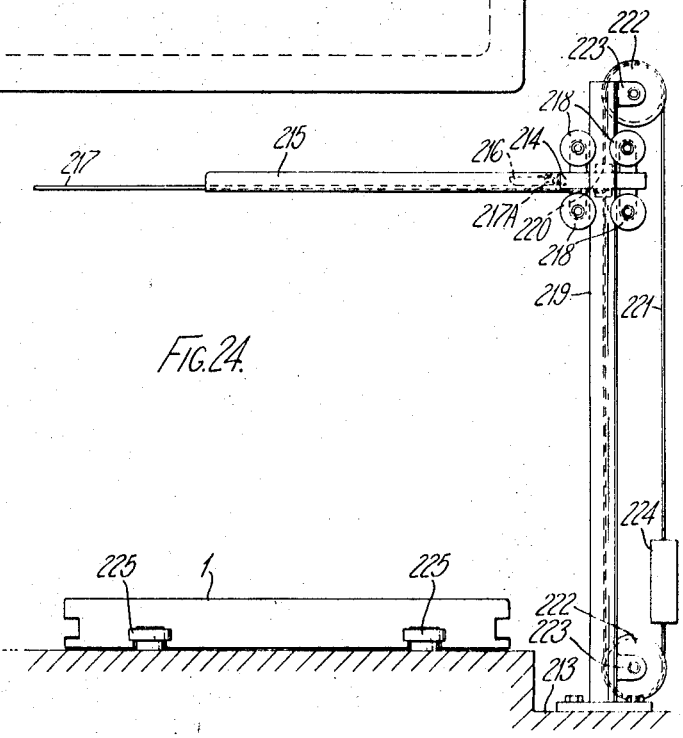
FIG. 24 is a side elevation of a template support.

FIG. 24 shows a template support mounted on a work setting table 213. The support comprises a holder 214 having two horizontal extensions 215 spaced apart by the width of a template and adapted to underlie the side edges of the template to support the latter in a horizontal position. The holder has a spring urged clip 216, beneath which is a stop 217A, so that a template 217 can be slid along and between the extensions 215 and under the the clip 216 until it abuts against the stop 217A, to position and hold the template in predetermined relationship to the holder. Attached to the holder are two sets of four peripherally concaved rollers 218 which run along two vertical guide rails 219 fixed to the table 213 (one extension 215, guide rail 219, and set of rollers 218 being obscured as viewed in FIG. 24). The holder 214 is fixed to a carrier 220 on an endless cord 221 passing round pulleys 222 mounted on fixed brackets 223 between the guide rails 219. The cord 221 further carries a counterweight 224 so that the holder 214, and a template held therein, will stay in a raised position by balance between the counterweight and the weight of the holder and template.

The work setting table 213 has a raised surface in front (i.e. to the left as viewed in FIG. 24) of the guide rails 219 and is provided with upstanding rollers 225 which are rotatable about a vertical axis and are positioned to fit T-slots along the underside of the pallet 1 to which the template 217 is to be applied. The pallet 1 can thus be moved into predetermined positional relationship to the guide rails 219 by running the T-slots past the rollers 225 until the pallet abuts a stop (not shown), and the template 217 can be lowered onto the pallet in predetermined positional relationship thereto, and raised vertically therefrom by running the holder 24 down and up the guide rails 219.

The apparatus shown in FIG. 24 can thus be used to apply templates to pallets for purposes previously described, and can replace the provision of different diameter holes adjacent diagonally opposed corners of a template, and correspondingly positioned and sized dowels at the work setting table, as described previously with reference to FIGS. 5 and 23.

Figure 25:
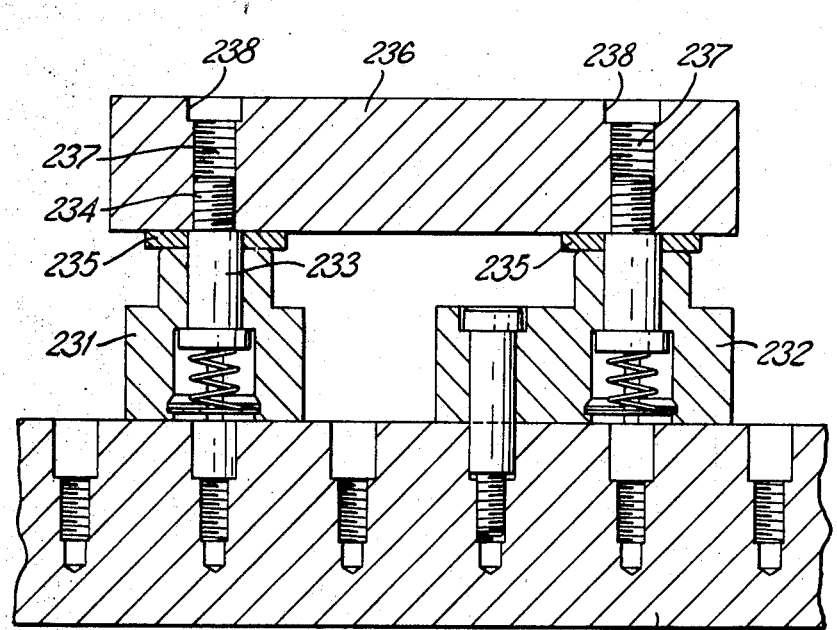
FIGS. 25 and 26 are sections through a pallet and support elements with a workpiece secured thereto, drawn to a different scale from that of FIG. 1.
Figure 26:
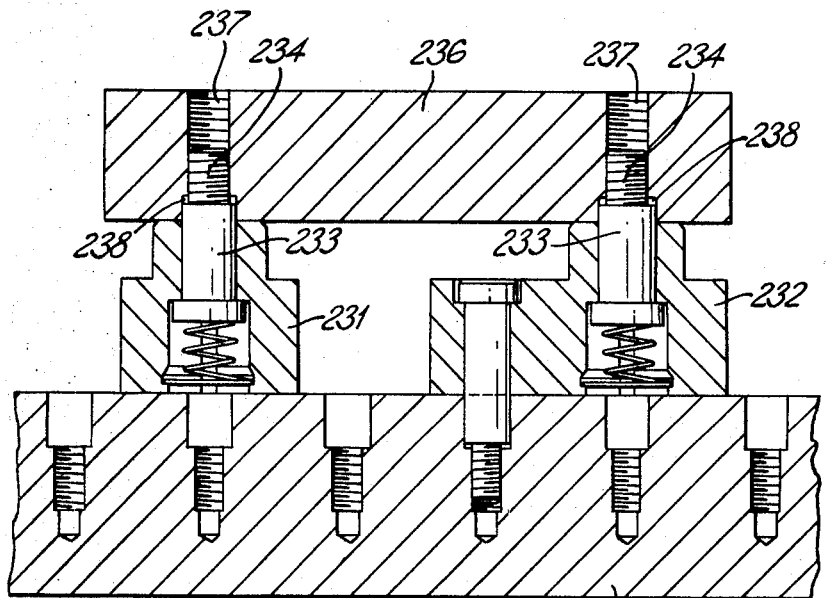

FIGS. 25 and 26 show a modified form of the fixing device 86, shown in FIG. 6, particularly adapted for use when a workpiece is to be subjected to a first machining operation whilst it is secured to a pallet, and is then to be released from the pallet and inverted before being resecured thereto for a second machining operation, and it is required that the positional relationship of the workpiece to the pallet for the second machining operation bears a predetermined relationship to its positional relationship to the pallet for the first machining operation.

FIGS. 25 and 26 show two support elements 231 and 232, generally similar to, and fixed to the pallet 1 in the same manner as, those previously described. Each of the support elements 231 and 232 houses a fixing device, essentially similar to the device 86 (FIG. 6) previously described, but having an accurate dowel portion 233 below an externally threaded part 234, the upper end of the dowel portion 233 being adapted to project from the raised support surface of the support element, as shown in FIGS. 25 and 26, when the lower flanged portion of the device abuts the shoulder provided in the support element.

The fixing devices shown in FIGS. 25 and 26 can be used as follows. The supports 231 and 232, containing the fixing devices, are secured to the pallet 1 at selected positions. Collars 235, adapted to fit over the dowel portions 233, are placed on the raised support surfaces of the support elements, and a workpiece 236, having pretapped holes 237 at a spacing corresponding to that between the two fixing devices, is placed on the collars so that the holes 237 register with the fixing devices. The workpiece is then secured to the support elements by screwing up the externally threaded parts 234 of the fixing devices into the tapped holes 237 in a manner as previously described with reference to FIG. 6, the parts 234 each having a recess into which a key can be inserted to effect rotation thereof.

The positions of the support elements 231 and 232 on the pallet 1 are selected so that the axis of each dowel portion 233 intersects the axis of inversion about which the workpiece can be considered to be rotated through 180° during its inversion between a first and a second machining operation (as explained previously in relation to the marking device shown in FIGS. 9 and 9A). The tapped holes 237 in the workpiece are located so that their axes nominally also intersect this axis of inversion.

The workpiece, thus secured to the pallet, is then subjected to a first machining operation which is made to include counterboring the upper (as viewed in FIG. 25) ends of the tapped holes 237 to produce circular recesses 238 of accurate diameter corresponding to that of the dowel portions 233 and accurately positioned so that the axes of the counterbores 238 intersect said axis of inversion. In other words, the machining operation, which is performed in accurate positional relationship to the pallet 1, is caused to produce counterbores 238 directly over the dowel portions 233, which are themselves accurately positioned relative to the pallet.

After the first machining operation the workpiece 236 is released from the support elements, by unscrewing the fixing devices from the tapped holes 237, and inverted. The workpiece is then placed back on the support elements (after removal of the collars 235) and positioned so that each tapped hole 237 registers with the same fixing device as previously. The fixing devices are screwed up into the tapped holes 237 so that the dowel portions 233 are received, as shown in FIG. 26, in the counterbores 238. The In this way the workpiece is accurately located in the same positional relationship to the pallet as that which it occupied for the first machining operation, except for its inversion, and can be subjected to a second machining operation whose pattern of machining on the workpiece bears a predetermined positional relationship to the pattern of the first machining operation. The requirement for accurate dowels and counterbores arises from the fact that sufficiently accurate positioning may not be reliably achieved merely by use of screw parts threaded into pretapped holes in the workpiece. In particular, there may be errors in the positional relationship and accuracy of the tapped holes 237 in the workpiece since these holes are preformed before the workpiece is secured to the pallet, i.e. independently of the actual machining operations. By machining the counterbores 238 during the first machining operation, for example where the machining operation is performed under numerical control the control tape or the like is programmed to include such counterboring, it can be ensured that the counterbores 238 are made in the workpiece at positions bearing an accurate predetermined relationship to the pattern of machining. Thus, by using these counterbores to effect relocation of the workpiece relative to the pallet for the second machining operation, the workpiece can be positioned so that the pattern of machining performed by the first machining operation is accurately relocated relative to the pallet. The tapped holes 237 in the workpiece are intentionally arranged to provide a relatively loose fit with the threaded parts 234, so that accurate repositioning of the workpiece by fitting the counterbores 238 over the dowels 233 can occur within the limits of such loose fit.

It will be noted that the workpiece is further spaced, by the height of the collars 235, from the pallet for the first machining operation than for the second machining operation, and the machining operations are therefore performed in a manner which allows for this.

It is to be appreciated that the arrangement shown in FIGS. 25 and 26 is described by way of illustration. In practice, the workpiece may be secured to the pallet 1 by further support elements and fixing or clamping devices, additional to those shown.

The method of relocating a workpiece described above with reference to FIGS. 25 and 26 may not provide the extreme accuracy achievable by use of diamond tipped marking devices in the manner explained previously with reference to FIGS. 9 and 9A. Notably, the method illustrated by FIGS. 25 and 26 depends on accurate location of the dowel portions 233 relative to the pallet 1, and there may be some slight error in this location, i.e. the centers of the dowels may not lie exactly at the junctions of the square grid on which they can nominally be located. However, the method illustrated by FIGS. 25 and 26 avoids the need for use of microscopes to effect relocation of the workpiece and can therefore be performed relatively quickly and simply. This method is thus suited to workpieces which, although requiring relocation with considerably accuracy, do not need the extremely high degree of accuracy provided by the method described with reference to FIGS. 9 and 9A, and which can advantageously be relocated on a pallet more quickly but with a lower degree of accuracy.

The devices described above can be used to particular advantage in a production system for producing a variety of components which uses a plurality of pallets of a common form, in particular a plurality of pallets like the described pallet 1, on which workpieces are transported and delivered to a number of numerically controlled machine tools each adapted to receive and automatically to locate such a pallet, for example a production system as described in U.S. Pat. application Ser. No. 695,817.

I claim:

1. A retaining device for securing a workpiece so that a machining operation can be performed on the workpiece while it is so secured, comprising; a hollow support element including a support surface at one side thereof, a base member, means to secure said support element to the base member with the side of said support element opposite said one side lying adjacent the base member, said support surface including an aperture, a retaining member mounted in said support element and including a screw threaded part projecting from said support surface through said aperture, and resilient means to urge said retaining member in a direction to cause said part to project from said support surface, said retaining member further including a recess in said part adapted for receiving a tool by means of which the retaining member can be rotated, whereby the tool can be inserted through a hole in the workpiece and through said aperture into said recess to screw said part of the retaining member into the workpiece and thereby secure the latter to the support surface.

2. A retaining device for securing a workpiece so that a machining operation can be performed on the workpiece while it is so secured, comprising; a hollow support element including a support surface at one side thereof, said support surface including an aperture, a retaining member mounted in said support element and including a screw threaded part projecting from said support surface through said aperture, and resilient means to urge said retaining member in a direction to cause said part to project from said support surface, said retaining member including a plain cylindrical portion of greater diameter than the screw-threaded part which can be positioned in a plain hole in the workpiece to locate it, said retaining member further including a recess in said part adapted for receiving a tool by means of which the retaining member can be rotated, whereby the tool can be inserted through a hole in the workpiece and through said aperture into said recess to screw said part of the retaining member into the workpiece and thereby secure the latter to the support surface.

3. A retaining device as claimed in claim 1 wherein said base member is a pallet.